Patented Sept. 10, 1940

2,214,419

UNITED STATES PATENT OFFICE 2,214,419

METHOD OF PRESERVING FOOD PRODUCTS

Charles L. Jones, Chicago, Ill., assignor to Continental Can Company, Inc., New York, N. Y., a corporation of New York No Drawing. Application July 27, 1939, Serial No. 286,907

3 Claims. (Cl. 99—182)

The invention relates to a method of preserving food products in sealed containers, and more especially the class of food products commonly referred to as non-acid canning products, examples of which are peas, corn, spinach, beans, asparagus and the like.

The general practice at the present time is to seal the food product in a metal container and then subject the food product in the container to heat treatment, usually referred to as processing, for the purpose of rendering sterile the food product in the container. High temperatures and relatively long periods of time are necessary for the rendering of the entire food product sterile by processing.

An object of the present invention is to provide a method by which the food product in a sealed container can be rendered commercially sterile by processing the same at a relatively low temperature.

It is well known that the difficulty of obtaining a sterile product is reduced by lowering the pH or working; in other words, in a more acid medium. However, with a few exceptions, the usual practice in the canning industry is to seal the product in the container in an approximately neutral syrup or brine so that the degree of acidity or alkalinity in the finished product is a direct result of the natural pH normal to the product being canned. It may be stated that at the present time the industry has never ventured in processing food products under a 2.0 pH or over an 8.0 pH.

The present invention is based on the discovery that strong alkali, which is known to be an efficient germicide, can be used on certain foods to produce improved products. The degree to which the pH is raised will depend upon the food product being processed. In general, it may be stated that when the pH is raised to 9.0 or over, a condition is created which greatly facilitates sterilizing. For example, I have discovered that in the canning of peas, if the pH is increased to 12.0 in the can, the product may then be sterilized without heating to the comparatively high temperatures found necessary in the ordinary canning practice. When the peas are canned in alkaline brine having a very high pH, I have found that commercial sterility can be reached in practice at temperatures 30° F., or more below standard sterilizing process, and have in fact secured good products without heating above the boiling point of water.

The invention is not limited to a single definite range of time and temperature, for the reason that the time-temperature cycle depends upon the product being treated. Thus, under particular conditions, it may be found that equal sterilizing efficiency may be had, for example, by heating for sixty minutes at 150° F.; fifteen minutes at 180° F.; or three minutes at the boiling point of water. Products having an unbroken skin generally stand somewhat higher temperatures than those in which the flesh of the vegetable or fruit is exposed to the full action of the alkali. The essential feature of the invention is the discovery that while small additions of mild alkalis to the food product render sterilization more difficult, large amounts of strong alkalis render sterilization very much easier, and enables a selection to be made of time and temperature best adapted to the preservation of the qualities desired by the market in the particular product under treatment. It will be noted that when the food product is processed at a relatively low temperature, that is, below the boiling point of water, the action of the strong alkali which greatly facilitates sterilizing, if it effects any injury to the product whatever, does so very slowly and satisfactory flavor can survive the processing treatment. Furthermore, when the product is processed under the conditions above stated, there is an additional advantage of affording almost complete protection to the green chlorophyll pigment of green vegetables.

The difficulty still remains that the product in the container is highly alkaline when sterilization is completed, and unless steps are taken to reduce this alkalinity, the value of the product for human food may be impaired. This difficulty is overcome by incorporating in the food product a sufficient amount of acid after the sterilizing has been effected to return the food product to a pH at which it is best suited for consumption. Any acid may be used to which there is no objection in the food product, such as tartaric, citric, or any other harmless, preferably naturally occurring acid.

It is preferable to introduce the acid into the container before it is sealed and in such a way that it does not become effective to lower the pH until sterilization of the product is completed. One way to accomplish this delayed action of the acid is to form an acid creating substance into a tablet by pressing, molding, melting or otherwise, and then completely encasing the tablet in a substance which is slowly soluble in the food product, or can be put in a slowly soluble form, and which substance is not disintegrated by the heat incident to processing. Various substances may be used for this purpose, but I prefer to use the same substances which are usually added to the food product, such as salt and sugar, although I may use other coating materials to modify or control the rate of solution. The casing is made up either wholly of salt or wholly of sugar, or a combination of salt and sugar, and the thickness of the casing depends upon the character of the food being processed. The thickness, however, should be sufficient so that as it slowly dissolves in the food product, the acid will be maintained out of contact with the food product until the sterilizing of the food product has been completed. The pellet produced by coating the acid creating substance with a slowly dissolving material, forms no part of the present invention, but is the joint invention of William H. Harrison and myself, and is described and claimed in a copending application filed August 14, 1939, Serial No. 290,070.

Instead of delaying the action of the acid creating substance by encasing the same in a substance which slowly dissolves, the acid creating substance after it is formed into the pellet may be coated with an impervious coating, which coating is punctured at one point by drilling a hole about one-sixteenth of an inch in diameter to approximately the center of the spherical pellet. The hole is sealed with a single drop of high melting wax so that the wax remains intact during the processing of the product. This can readily be accomplished when the pH of the product is raised sufficiently so that it may be processed by holding the sealed containers in a water bath at 140° F. for a time period sufficient to render the product sterile. The wax seal prevents the acid creating substance from contacting with the food product, and therefore, the full alkalinity is effective throughout the processing period. At the end of this period, the can is removed from the bath and placed in boiling water for a period sufficient to melt the wax and release the acid for neutralizing the alkali in the can thus restoring the product to its normal pH.

I have also found that phthalic anhydride may be used without any coating, by casting the same into a spherical pellet. The rate of solution of the pellet is so slow that from the limited surface of the pellet insufficient acid is made immediately available to interfere with sterilization at a relatively low temperature, though unfortunately the bitter taste of phthalic acid renders it useless commercially.

In certain cases, such as green beans, it is possible to get palatable products by omitting the acidifying pellet altogether, and merely removing some of the free alkali by washing the product when it is cooked.

The process is particularly useful in connection with the packaging of food products in glass containers, because of the fact of the relatively low temperature at which the product can be processed. The present known methods of processing require temperatures which are often too severe for glass containers, resulting in the breaking of the container.

In the processing of any product by the method described above, the choice of time-temperature cycle and the degree of pH to which the product is raised is necessarily a compromise between the optimum condition for sterilizing, and the best condition for preventing damage to the product. A different compromise will be found for each product, and may be even re-determined from time to time to meet changes in public taste or the varied requirements of different markets. The invention, therefore, is not limited to any particular time-temperature cycle, or any particular degree of pH to which the product is raised, or to the particular manner of restoring the pH after the product has been rendered sterile by processing. The essential steps are, however, the increasing of the pH so as to facilitate sterilizing of the product and the returning of the pH to substantially the natural pH of the food product after sterilizing has been effected.

It is also to be understood that the food product may be placed in a container in which it is to be marketed with a suitable alkali for increasing the pH over 9.0, then subjected the filled container to a pasteurizing temperature and subsequently thereto a neutralizing agent added and the container sealed.

While the invention has been described as applied specifically to the sterilizing of food products in containers, it will be understood that it may be used for the sterilizing of food products in bulk, in which case the alkali would be added to the food product before sterilizing and the acid added to the food product after sterilizing has been effected.

Having thus described the invention, what I claim as new and desire to secure by Letters Patent, is:

1. The process of sterilizing non-acid food products comprising adding sufficient alkali to the product to raise and maintain the pH of the product above 9.0, subjecting the product to heat for a time sufficient to sterilize the product and then restoring the product to the desired pH for consumption.

2. The process of sterilizing non-acid food products comprising adding a strong alkali to the product to raise and maintain the pH of the product above 9.0, heating the food product to a temperature below 225 degrees F. for a time sufficient to sterilize the product, and then neutralizing the product with sufficient acid to restore the same to the proper pH for consumption.

3. The process of preserving food products which consists in sealing the food product in a container with sufficient alkali to raise and maintain the pH of the contents above 9.0, and subjecting the container to heat for a sufficient time to sterilize the product in the container, and including in the container an acid creating substance enclosed in a non-toxic slowly dissolving material whereby the acid is maintained out of contact with the food product until sterilizing has been effected.

CHARLES L. JONES.